United States Patent
Mital et al.

(10) Patent No.: US 8,244,766 B2
(45) Date of Patent: Aug. 14, 2012

(54) APPLYING A MODEL OF A PERSONA TO SEARCH RESULTS

(75) Inventors: Vijay Mital, Kirkland, WA (US); Saurab Nog, Sammamish, WA (US); Jason A. Wolf, Kirkland, WA (US); John A. Payne, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 170 days.

(21) Appl. No.: 12/759,097

(22) Filed: Apr. 13, 2010

(65) Prior Publication Data

US 2011/0252014 A1    Oct. 13, 2011

(51) Int. Cl.
     *G06F 17/30*      (2006.01)
(52) U.S. Cl. .......... 707/791; 707/802; 707/822; 707/808
(58) Field of Classification Search ........... 707/600–899
See application file for complete search history.

(56) References Cited

U.S. PATENT DOCUMENTS

| | | | |
|---|---|---|---|
| 6,314,420 B1 | 11/2001 | Lang et al. | |
| 7,072,888 B1 | 7/2006 | Perkins | |
| 7,647,306 B2 | 1/2010 | Rose et al. | |
| 2005/0071328 A1 | 3/2005 | Lawrence | |
| 2006/0020593 A1* | 1/2006 | Ramsaier et al. | 707/5 |
| 2006/0112079 A1 | 5/2006 | Holt et al. | |
| 2007/0220411 A1 | 9/2007 | Hauser | |
| 2009/0077033 A1 | 3/2009 | McGary et al. | |
| 2009/0287683 A1 | 11/2009 | Bennett | |

FOREIGN PATENT DOCUMENTS

GB      2 335 761 A      9/1999

OTHER PUBLICATIONS

Robertson, Mark R., "Sproose—Social Video Search Engine & Voting," Nov. 20, 2007, http://www.reelseo.com/sproose-social-video-search/.

* cited by examiner

*Primary Examiner* — Isaac M Woo
(74) *Attorney, Agent, or Firm* — The Law Office of Michael E. Kondoudis

(57) ABSTRACT

A data search and retrieval system that, in response to a search query, applies a model to search results to generate information to be returned to a user. The model may define characteristics of a persona such that the application of the model generates information consistent with the persona. A persona may be an individual person or a group of people having shared characteristics. A user may be presented with a list of identifiers of available models of personae. When the user selects a model of a particular persona to be applied, the information generated in return to the user may be consistent with the characteristics associated with the selected persona.

14 Claims, 11 Drawing Sheets

APPLYING A MODEL OF A PERSONA TO SEARCH RESULTS

BACKGROUND

With the widespread availability of information over networks, such as the Internet, search engines have come into widespread use. Search engines receive user queries and find content matching the query to return to the user. A common approach to implementing a search engine is through a page index. The page index relates terms that may appear in a search query to units of content on the network, frequently called web pages.

Various approaches exist for constructing and applying the page index. Constructing the index frequently entails "crawling" a network, such as the Internet, containing the body of data that will eventually be searched. Crawling entails following links from one web page to the next and analyzing each page. As part of the analysis, terms characterizing the web page may be identified and added to the page index in a way that associates that web page with those terms. These terms may be terms actually used within the content displayed by the web page or may be tags added specifically to influence how the crawler indexes the web page. Additionally, information, such as the number of links to a web page, may be captured and used to prioritize the web pages.

The page index is applied as part of a search stack. When a user submits a search query, a search engine matches terms in the query to web pages based on the search index. The search stack may include components that modify the search query before the index is consulted, such as to correct misspelling of search terms or attach terms that can be inferred based on a user profile. The search stack may also include components to filter search results. For example, web pages identified using the page index may be filtered, such as by ranking the web pages based on a metric indicating relevance to a query.

In scenarios in which search queries seeking information that may not appear directly on a web page are anticipated, information may be pre-computed. An entry may be made in the page index, pointing to the pre-computed information rather than a web page.

SUMMARY

The usefulness of a search system may be improved by incorporating into a search stack of the system components that may select and apply a model characterizing information to be provided in response to a search query. The model may be selected from a set of models based on user context information, such as a search query from a user and/or data identified by a search engine in response to the search query. Application of the model may result in generation of new information, in addition to formatting, filtering or processing data returned by a search engine executing the query.

A model may define characteristics consistent with a persona. Applying such a model of a persona to search results may generate information that is consistent with the characteristics of the persona. Such a persona may be an actual person of an individual person or an abstract persona, representing a group of people having shared characteristics.

A user may be presented with a list of identifiers of available models of personae. When the user selects a model of a particular persona to be applied, the information generated in return to the user may be consistent with the characteristics associated with the selected persona. Thus, by being able to choose and compare the application of models of different personae to search results, the user may choose to receive information generated consistent with characteristics of a persona that better corresponds with the user's current needs.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
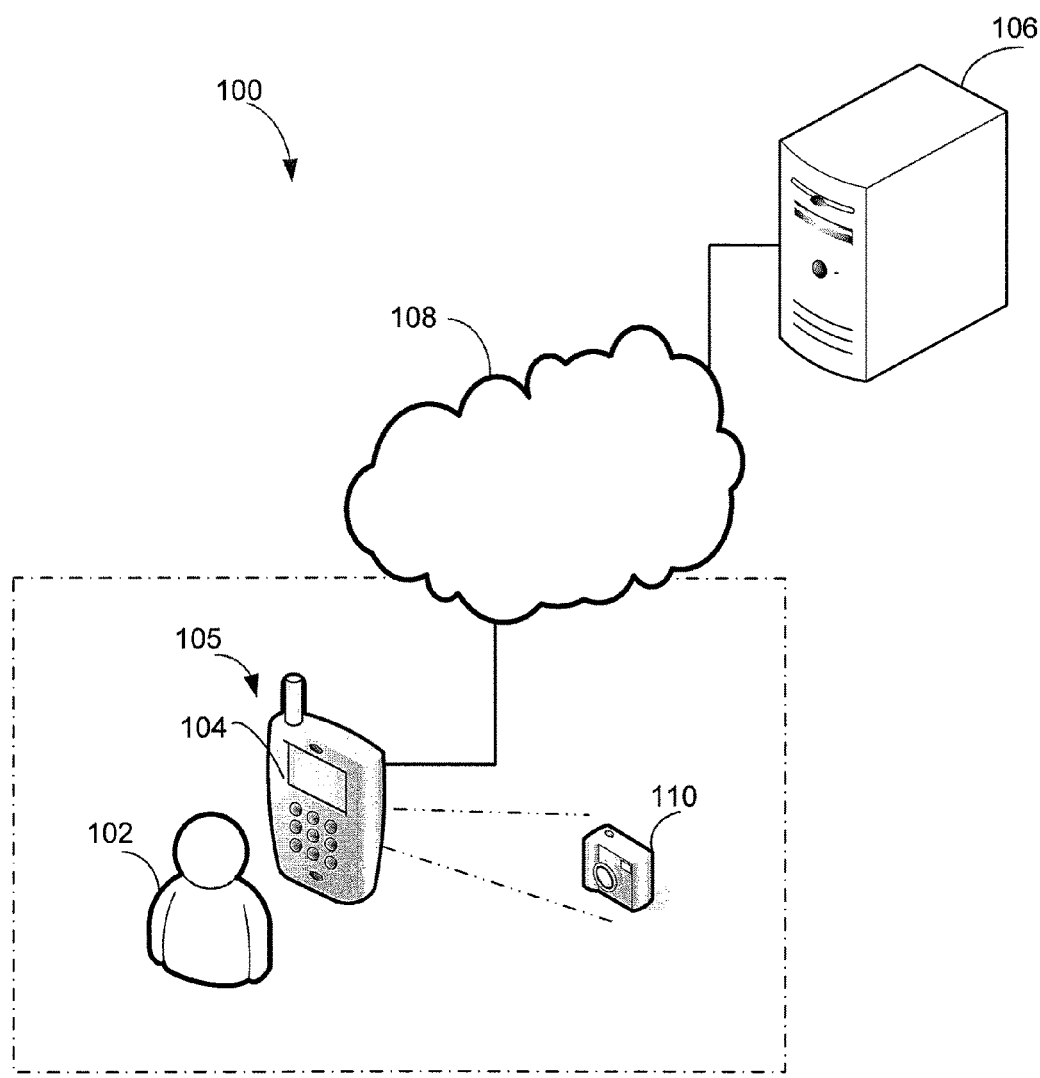
FIG. 1 is a high level block diagram illustrating a computing environment in which some embodiments of the invention may be practiced.

The inventors have recognized and appreciated that functionality and utility of search systems may be expanded by incorporating into a search stack of a search system components that can select and apply one or more models characterizing data to be provided to a user in the user's context. In response to a search query, or other input identifying user context, the system may identify a model to apply in generating information for the user. The model may be selected based on user context information, that may include the search query itself or data generated by a search engine applying the search query to select web pages.

Once a model is selected, a model application engine may apply the model to generate information to be provided to the user. A model may include one or more elements, at least some of which define a computation to be performed based on data dynamically identified for the user's context. For example, application of the model may result in a computation that has inputs relating to terms in the search query or data generated by a search engine applying the search query. The output of the computation may be provided to the user as a result of the search query, either alone or in conjunction with data located by a search engine or other dynamically generated data.

In some embodiments, the computation may be based on an equation represented in the model. The equation may specify a mathematical operation to be performed on data that is dynamically identified by the search engine. Such a mathematical operation may include other data, such as user data obtained from a user profile or based on context information. Applying models in a search stack may greatly expand the type of information that may be returned to a user and may be applied in many different contexts.

For example, a model may include an equation, defining computation of calorie content from a recipe. Such a model may be applied in response to a query requesting recipes such that, in addition to receiving content representing recipes found on web pages, a user may receive calorie content, even though that information was not included on the web pages. As another example, a model may include a formula for computing commuting distance or time from a location. Such a model may be applied in response to a query requesting information on houses for sale such that, in addition to receiving a listing of houses for sale identified as a result of a search, a user may receive commuting information with each house. As yet another example, a model may include a formula for generating a metric comparing a patient's lab results to a population norm. Such a model may be applied in a search system coupled to an intranet in a hospital such that, when a search is conducted for lab results of a patient, a clinician may receive, in addition to lab results for the patient, comparative data characterizing the results based on an analysis of lab results in medical records for other users returned as a result of the search.

A search system may contain multiple models, applicable in different contexts. Accordingly, a search system may contain a component that selects a model for a specific context. A component to perform this function may access a model index. In some embodiments, the model index may have a form analogous to a page index used by a search engine. In this way, existing techniques optimized for high speed search may also be used to quickly select and apply a model. Such an approach may be useful in scenarios in which a model is identified based on terms or other aspects of a search query. Further, in some embodiments, the models may be treated as web pages and may include meta tags to aid in indexing them in a search engine.

To facilitate the use of models, each model may be represented as a collection of declarative statements. In this way, the models may be relatively easy to produce and apply. Further, by having the models applied in a model engine, an entity providing search services may receive models from third parties and apply them in an environment in which application of the model cannot interfere with operation of the computer equipment that implements the search system.

As a result, knowledge useful in generating search results may be captured in models and shared across search systems. Further, by allowing the models to be applied in the search stack of a search system, models may perform computations or other operations based on data that is only available within the search system.

The inventors have further recognized that an information search and retrieval system may be adapted to generate useful and/or desirable information by providing models that define characteristics consistent with personae. Applying such a model of a persona to search results may generate information that is consistent with the characteristics of the persona. Such a persona may be an individual person, such as, for example, a celebrity, an expert in a particular field, a user, and/or a friend of the user. Thus, applying a model of an individual person to search results may generate information that is consistent with characteristics associated with that particular person; for example, the generated information may reflect the particular person's likes and/or dislikes. A persona may also be a group of people having shared characteristics. For example, the group of people may have a similar interest, ability (e.g., novice vs. professional), background, or any suitable shared characteristic. Applying a model of a group persona to search results returned from a particular search query may generate information that is consistent with shared characteristics of that group of people.

In some embodiments, a user may be presented with a list of identifiers of suitable available models that may be applied to particular search results. When the user selects a model of a particular persona to be applied, the information generated in return to the user may be consistent with the characteristics associated with the selected persona. The process of selecting a model to be applied may be iterative, so that a user may in turn apply different models to the same set of search results, thereby being returned different generated information. Thus, by being able to choose and compare the application of models of different personae to search results, the user may choose to receive information generated consistent with characteristics of a persona that better corresponds with the user's current needs or interests.

FIG. 1 is a high level diagram illustrating a computing environment 100 in which some embodiments of the invention may be practiced. Computing environment 100 includes a user 102 interacting with a computing device 105. Computing device 105 may be any suitable computing device, such as a desktop computer, a laptop computer, a mobile phone, or a PDA. Computing device 105 may operate under any suitable computing architecture, and include any suitable operating system, such as variants of the WINDOWS® Operating System developed by MICROSOFT® Corporation.

Computing device 105 may have the capability to communicate over any suitable wired or wireless communications medium to a server 106. The communication between computing device 105 and server 106 may be over computer network(s) 108, which may be any suitable number or type of telecommunications networks, such as the Internet, a corporate intranet, or cellular networks. Server 106 may be implemented using any suitable computing architecture, and may configured with any suitable operating system, such as variants of the WINDOWS® Operating System developed by MICROSOFT® Corporation. Moreover, while server 106 is illustrated in FIG. 1 as being a single computer, it may be any suitable number of computers configured to operate as a coherent system.

In the example of FIG. 1, server 106 operates as a search engine, allowing user 102 to retrieve information relevant to a search query. The user may specify the query explicitly, such as by inputting query terms into computing device 105 in any suitable way, such as via a keyboard, key pad, mouse, or voice input. Additionally and/or alternatively, the user may provide an implicit query. For example, computing device 105 may be equipped with (or connected via a wired or wireless connection to) a digital camera 110. An image, such as of an object, a scene, or a barcode scan, taken from digital camera 110 may serve as an implicit query.

Regardless of the type of input provided by user 102 that triggers generation of a query, computing device 105 may send the query to server 106 to obtain information relevant to the query. After retrieving data relevant to the search query, such as, for example, web pages, server 106 may apply one or more declarative models to the data to generate higher level information to be returned to user 102. The information generated by server 106 may be sent over computer network(s) 108 and be displayed on display 104 of computing device 105. Display 104 may be any suitable display, including an LCD or CRT display, and may be either internal or external to computing device 105.

Figure 2:
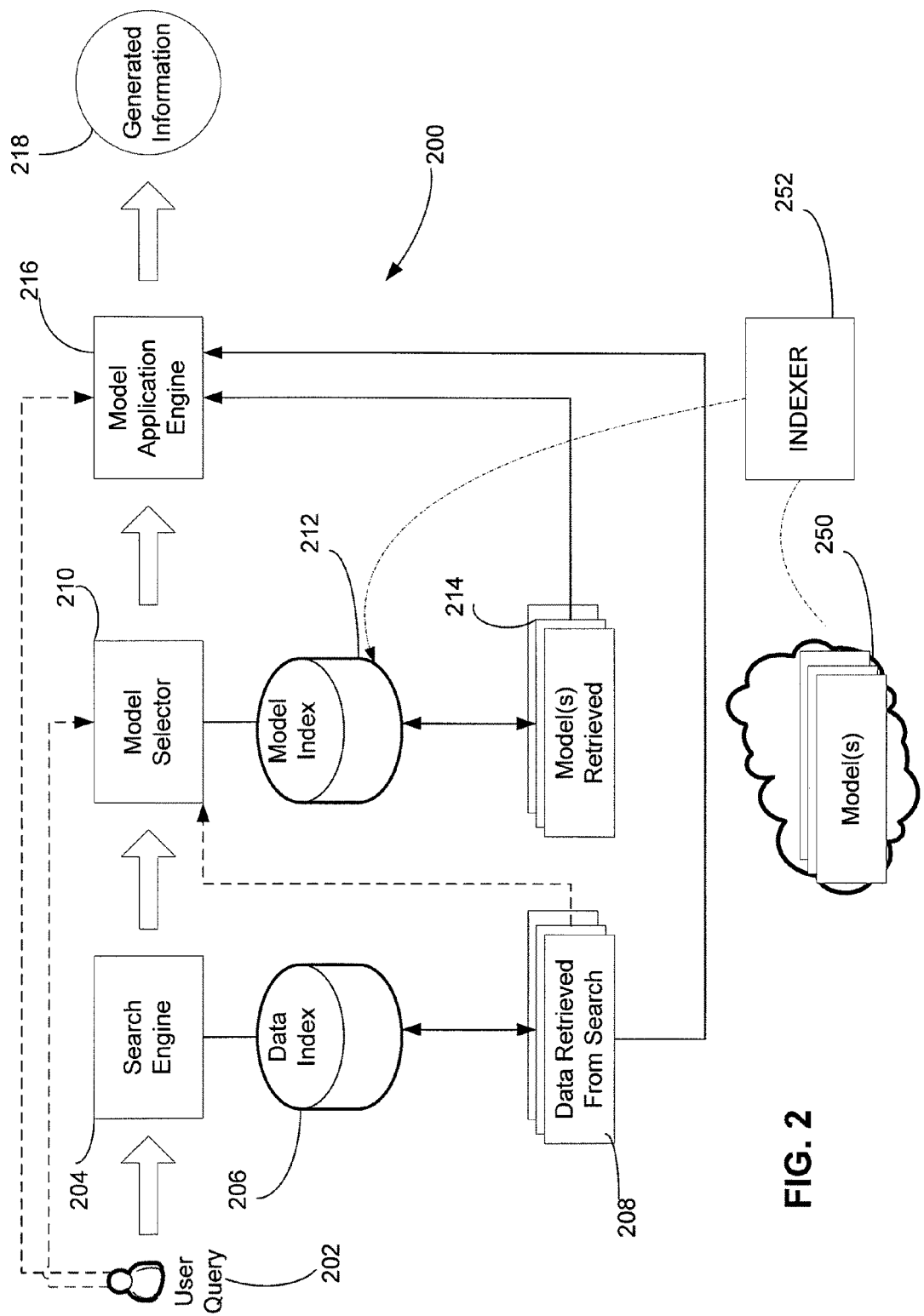
FIG. 2 is an architectural block diagram of a search stack according to some embodiments.

FIG. 2 is an architectural block diagram of a search stack 200 according to some embodiments, such as may be implemented by server 106 of FIG. 1. The components of search stack 200 may be implemented using any suitable configuration and number of computing devices, such as for purposes of load-balancing or redundancy. For example, the functionality described in connection with each component of the search stack may be performed by different physical computers configured to act as a coherent system, and/or a single physical computer may perform the functionality ascribed to multiple components. In addition, in some embodiments, some of the functionality ascribed to a single component of the search stack may be distributed to multiple physical computers, each of which may perform a different portion of the computation in parallel.

Regardless of the specific configuration of search stack 200, a user query 202 may be provided as input to search stack 200 over a computer networking communications medium, and may be either implicit or explicit, as discussed in connection with FIG. 1. In the example of FIG. 2, user query 200 is provided to an input component in search stack 200, such as search engine 204, which may be any suitable search engine, such as the BING® search engine developed by Microsoft Corporation. Search engine 204 may be coupled to one or more storage media comprising a data index 206. Data index 206 may be stored on any suitable storage media, including internal or locally attached media, such as a hard disk, storage connected through a storage area network (SAN), or networked attached storage (NAS). Data index 206 may be in any suitable format, including one or more unstructured text files, or one or more relational databases.

Search engine 204 may consult data index 206 to retrieve data 208 related to the user query 202. The retrieved data 208 may be a data portion of search results that are retrieved based on user query 202 and/or other factors relevant to the search, such as a user profile or user context. That is, data index 206 may comprise a mapping between one or more factors relevant to a search query (e.g., user query terms, user profile, user context) and data, such as data pages, that match and/or relate to that query. The mapping in data index 206 may be implemented using conventional techniques or in any other suitable way.

Regardless of the type of mapping performed using data index 206 to retrieve data 208 relevant to the search, data 208 may comprise any suitable data retrieved by search engine 204 from a large body of data, such as, for example, web pages, medical records, lab test results, financial data, demographic data, video data (e.g., angiograms, ultrasounds), or image data (e.g., x-rays, EKGs, VQ scans, CT scans, or MRI scans). Data 208 may be retrieved or identified dynamically by search engine 204 or it may be cached as the result of a prior search performed by search engine 204 based on similar or identical query. Data 208 may be retrieved using conventional techniques or in any other suitable way.

The search stack 200 may also include a model selection component, such as model selector 210, which may select one or more appropriate declarative model(s) 214 from a set of models stored on one or more computer readable media accessible to the model selector 210. The model selector 210 may then apply the selected model(s) 214 to the results (i.e., data 208) of the search performed by search engine 204. Model selector 210 may be coupled to model index 212, which may be the same as data index 206 or may be a separate index. Model index 212 may be implemented on any suitable storage media, including those described in connection with data index 206, and may be in any suitable format, including those described in connection with data index 206. Model index 212 may comprise a mapping between one or more factors relevant to the user's search (e.g., terms in user query 202, user profile, user context, and/or the data 208 retrieved by the search engine 204) and appropriate model(s) 214 that may be applied to the data 208 retrieved by search engine 204.

Selected models 214 may be selected from a larger pool of models 250 stored on computer-readable media associated with server 106 (FIG. 1). In some embodiments, pool of models 250 may be supplied by an entity operating the search system. Though, in other embodiments, all or a portion of the models in pool of models 250 from which models 214 are selected may be provided by parties other than the entity operating the search system. In some embodiments, models in pool of models 250 may be supplied by a user inputting user query 202. In such a scenario, a portion of pool of models 250 accessed by model selector 210 may include computer storage media segregated to store data personal to individual users, such as the user submitting user query 202. In other embodiments, a community of users may have access to the search system and pool of models 250 may include models submitted by users other than the user who submitted user query 202. In yet other embodiments, some or all of the models in pool of models 250 from which models 214 were selected may be provided by other third parties. Such third parties may include businesses or organizations that have a specialized desire or ability to specify the nature of information to be generated in response to a search query. For example, a model that computes commuting distance from a house for sale may be provided by a real estate agent. A model that computes comparative lab results may be provided by a medical association. Accordingly, it should be appreciated that any number or type of models may be incorporated in pool of models 250.

In some embodiments, to facilitate easy addition of models to pool of models 250, the search system illustrated in FIG. 2 may include an indexer 252. Indexer 252 may update model index 212 based on models contained within pool of models 250. In some embodiments, each of the models in pool of models 250 may contain meta tags identifying context in which the model may be applied. Indexer 252 may use this information similar to meta tags attached to web pages to construct model index 212. In this regard, indexer 252 may be implemented using technology known in the art for implementing a web crawler to build a page index. To support such an implementation, each of the models in pool of models 250 may be formatted as a web page. However, it should be recognized that any suitable technique may be used for constructing model index 212, including machine learning techniques or explicit human input. Model selector 210 may be implemented using technology known in the art for implementing a search engine based upon an index. However, rather than identifying which pages to return to a user based on a data index, model selector 210 may employ model index 212 to identify models used in generating information to provide to a user. Model selector 210 may identify models based on a precise match between factors relevant to the search and terms in the model index. Though, inexact matching techniques may alternatively or additionally be used. In some embodiments, the declarative models are themselves stored in model index 212, while in other embodiments, the models themselves may be stored separately from model index 212, but in such a way that they may be appropriately identified in model index 212.

Search stack 200 may also include a model application engine 216, which may apply the selected model(s) 214 to the data 208 retrieved by search engine 204. In the application of a model, data 208 may serve as a parameter over which the selected model(s) is applied by model application engine 216. Additional parameters, such as portions of user query 202, may also be provided as input to the selected model(s) during model application. Though, it should be appreciated that any data available within the search environment illustrated in FIG. 2 may be identified in a model or used by model application engine 216 when the model is applied.

As a result of the application of the model to the search results performed by model application engine 216, information 218 may be generated. Generated information 218 may be returned to the user by an output component (not shown) of search stack 200. Though, the generated information may be used in any suitable way, including as a query for further searching by search engine 204. Generated information 218 may include the results of model application performed by model application engine 216, may include data 208 retrieved by the search engine 204, or any suitable combination thereof. For example, based on the application of a model performed by the model application engine 216, the ordering of the presentation to a user of data 208 may change, the content presented as part of data 208 may be modified so that it includes additional or alternative content that is the result of a computation performed by model application engine 216, or any suitable combination of the two. Thus, when selected model(s) 214 are applied to raw data, such as data 208, retrieved by a search engine, the generated information 218 may be at a higher level of abstraction and therefore be more useful to a user than the raw data itself.

Figure 3:
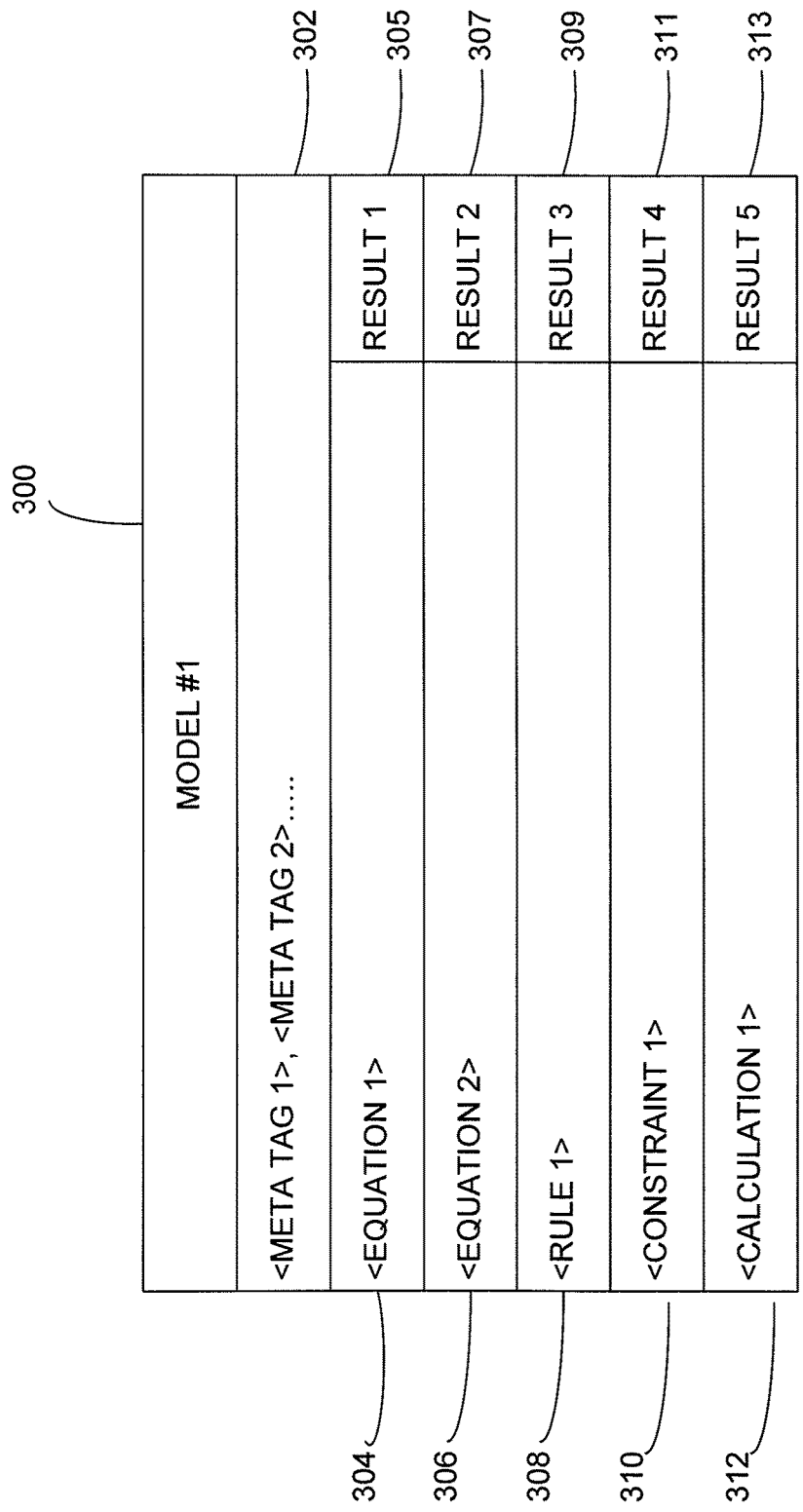
FIG. 3 is a diagram of types of statements that may comprise the specification of a declarative model.

FIG. 3 is a sketch of a data structure string of a declarative model 300, such as one of model(s) 214 selected by model selector 210 of FIG. 2. Model 300 may be stored in any suitable way. In some embodiments, it may be stored in a file, and may be treated as a web page. Accordingly, in such embodiments, like other web pages, model 300 may include meta tags 302 to aid in indexing the model, such as in model index 212 of FIG. 2, thus relating the model to factors such as a query that are relevant to a search.

Model 300 may comprise one or more elements, which in the embodiment illustrated are statements in a declarative language. In some embodiments, the declarative language may be at a level that a human being who is not a computer programmer could understand and author. For example, it may contain statements of equations and the form of a result based on evaluation of the equation, such as equation 304 and result 305, and equation 306 and result 307. An equation may be a symbolic or mathematical computation over a set of input data.

Model 300 may also comprise statement(s) of one or more rules, such as rule 308 and the form of a result based on evaluation of the equation, such as rule result 309. The application of some types of rules may trigger a search to be performed, thereby collecting new information. According to some embodiments, when a model such as model 300 containing a rule, such as rule 308, is applied, such as by model application engine 216, the evaluation of the rule performed as part of the application of the model may generate a search query and trigger a search to be performed by the data search engine, such as search engine 204. Thus, in such embodiments, an Internet search may be triggered based on a search query generated by the application of a model to the search data. Though a rule may specify any suitable result. For example, a rule may be a conditional statement and a result that applies, depending on whether the condition evaluated dynamically is true or false. Accordingly, the result portion of a rule may specify actions to be conditionally performed or information to be returned or any other type of information.

Model 300 may also comprise statement(s) of one or more constraints, such as constraint 310 and result 311. A constraint may define a restriction that is applied to one or more values produced on application of the model. An example of a constraint may be an inequality statement such as an indication that the result of applying a model to data 208 retrieved from a search be greater than a defined value.

Model 300 may also include statements of one or more calculations to be performed over input data, such as calculation 312. Each calculation may also have an associated result, such as result 313. In this example, the result may label the result of the specified calculation 312 such that it may be referenced in other statements within model 300 or otherwise specifying how the result of the computation may be further applied in generating information to a user. Calculation 312 may be an expression representing a numerical calculation with a numerical value as a result, or any other suitable type of calculation, such as symbolic calculations. In applying model 300 to data 208 retrieved by a search engine, model application engine 216 may perform any calculations over data 208 that are specified in the model specification, including attempting to solve equations, inequalities and constraints over the data 208. In some embodiments, the statements representing equations, rules, constraints or calculations within a model may be interrelated, such that information generated as a result of one statement may be referenced in another statement within model 300. In such a scenario, applying model 300 may entail determining an order in which the statements are evaluated such that all statements may be consistently applied. In some embodiments, applying a model may entail multiple iterations during which only those statements for which values of all parameters in the statement are available are applied. As application of some statements generates values used to apply other statements, those other statements may be evaluated in successive iterations. If application of a statement in an iteration changes the value of a parameter used in applying another statement, the other statement will again be applied based on the changed values of the parameters on which it relies. Application of the statements in a model may continue iteratively in this fashion until a consistent result of applying all statements in the model occurs from one iteration to the next, achieving a stable and consistent result. Though, it should be recognized that any suitable technique may be used to apply a model 300.

Figure 4:
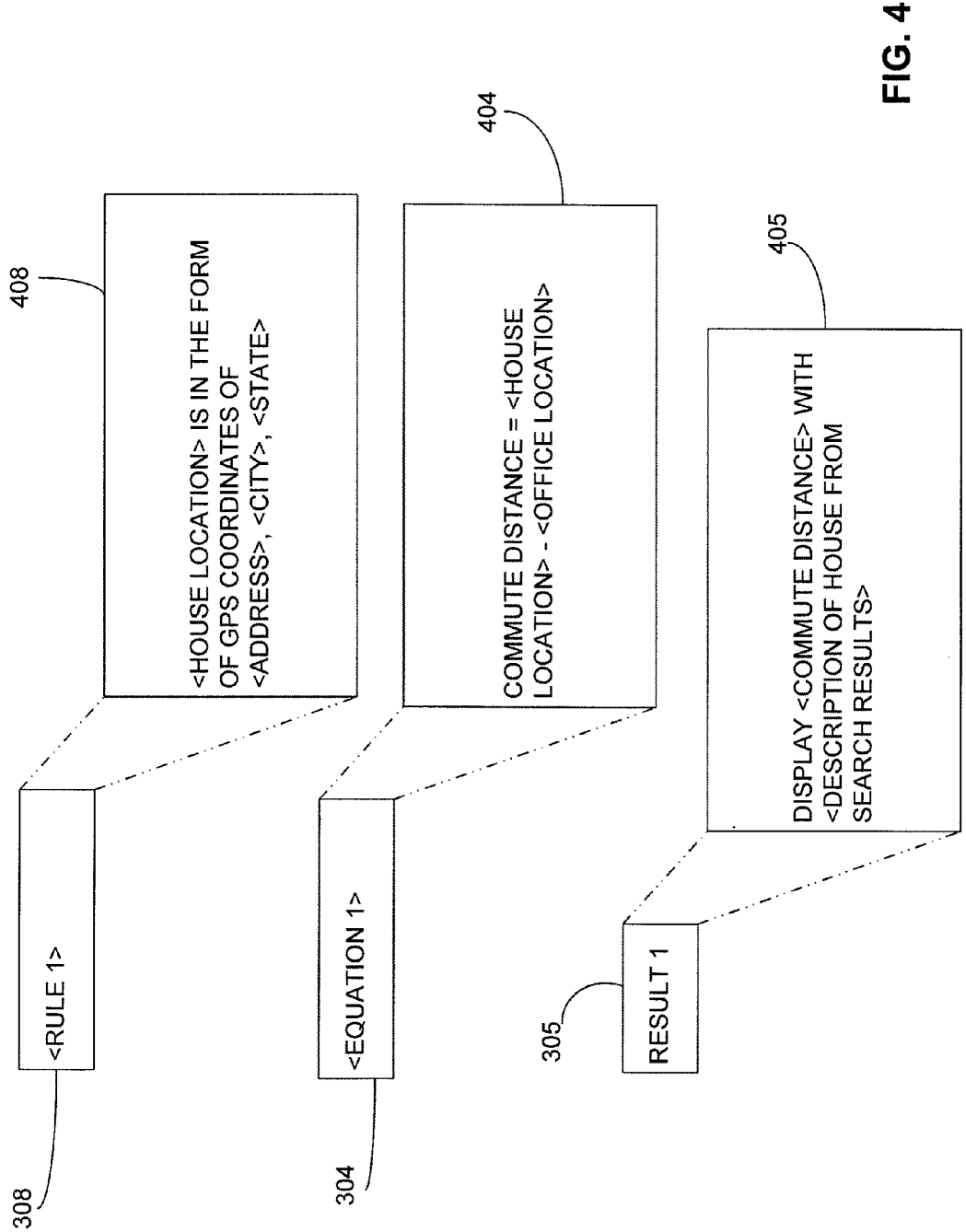
FIG. 4 is a diagram of an example of statements, such as those that may be specified for the declarative model of FIG. 3.

FIG. 4 provides an example of statements such as those that may be specified for model 300. In the example of FIG. 4, the model may be selected and applied when a user is performing a house search, and may in this example, relate houses for sale to the user's commute. Application of the model in the example of FIG. 4 may generate information on the commuting distance and/or time between each house for sale and the user's office location. Thus, rule statement 408 is an example of rule 308 from FIG. 3 that specifies the form of a house location to be used as part of the model computations. In this example, rule statement 408 specifies that a parameter, identified as a house location, be in the form of global positioning system (GPS) coordinates of the address, city and state of the house for sale. These parameters may, when the model is applied, be given values by model application engine 216 based on retrieved data 208. In this example, rule 308 may evaluate to true when a web page or other item of retrieved data contains information that is recognized as a house location by application of rule 308. Accordingly, rule 308 may be used to identify items of data for which other statements within the model are applied.

Equation statement 404 is an example of equation 304 of FIG. 3 that provides a computation to be performed to arrive at the commute distance, based on the location of the house for sale as specified in rule statement 408 and a value that may be available to model application engine 216, which in this example is indicated as the office location. In this example, the office location is an input parameter to the model that may have been provided, for example, as part of the user query, as part of the user's profile or user context. The house location, however, is based on the application of rule statement 408, received from another input to the model, such as data 208 that are returned as the result of the search engine.

Result statement 405 is an example of result 305 of FIG. 3 that specifies how to display the result of the computation performed for equation statement 404. Thus, result statement 405, in this example, specifies that the commute distance to each house for sale from the search results be displayed alongside the description of the house, which is a parameter for which a value may be established based on data 208.

The example of FIG. 4 illustrates some of the statements that may be present in a model to display results to a user query. In this example, the results relate to houses for sale. Accordingly, the model depicted in FIG. 4 may be selected by model selector 210 (FIG. 2) in response to a user query 202 requesting information on houses for sale. The model may be applied by model application engine 216 to every item of data in retrieved data 208. Though, not every retrieved item of data may comply with rule 308 or other conditions established by statements within the model. Accordingly, not every item of retrieved data 208 may be included in generated information 218. Though, FIG. 4 illustrates that other information, not expressly included within retrieved data 208, may be included in generated information 218. In the simple example of FIG. 4, a value of a parameter called "commute distance" is computed by model application engine 216 upon application of the model of FIG. 4.

Figure 5:
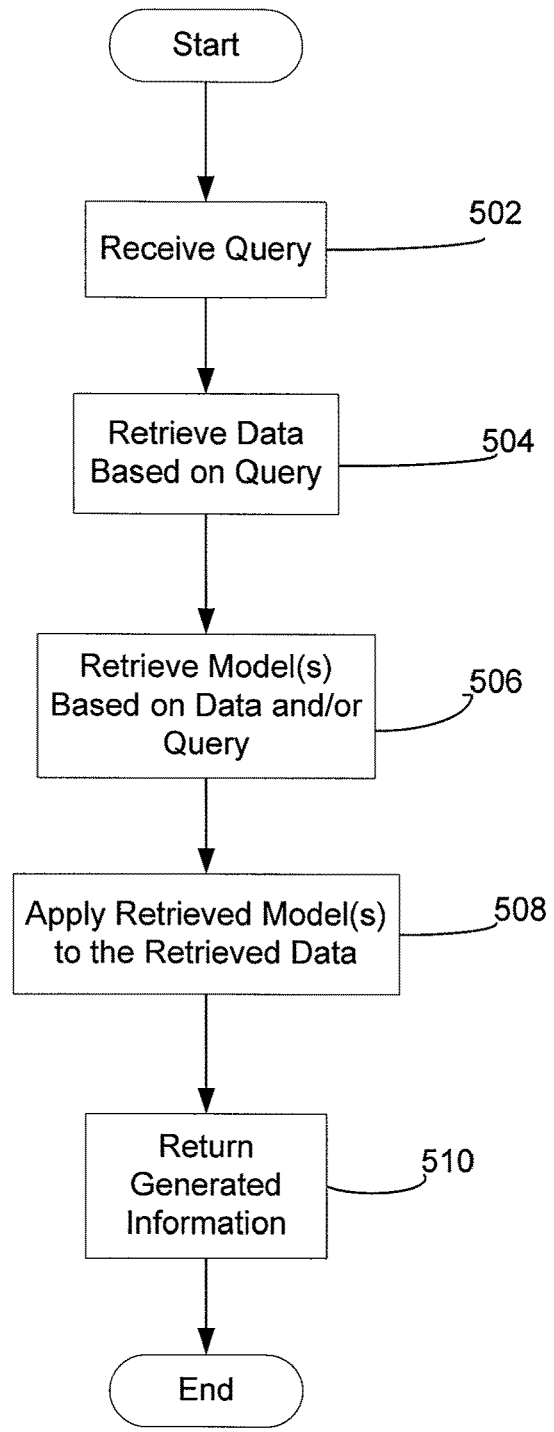
FIG. 5 is a flowchart of a process that may be performed during execution by a search stack, according to some embodiments.

FIG. 5 is a flowchart of a process that may be performed during execution by a search stack, such as search stack 200 of FIG. 2 according to some embodiments. The process may start when a computing device, such as computing device 105 of FIG. 1, sends a search query on behalf of a user to a search engine, such as search engine 204 of FIG. 2. Though, it is not a requirement that the search process be triggered by express user input or express user input in textual form. Non-textual inputs or implied user inputs may be regarded as a query triggering execution of the process of FIG. 5.

In step 502, the search stack may receive the user's query. As discussed above, a user's query may be either implicit or explicit. For example, in some embodiments, a search stack may generate a search query on behalf of the user. The search stack, for example, may generate a search query based on context information associated with the user. This may be performed for example, by search engine 204 of FIG. 2.

Regardless of how the query is generated, in step 504, the search engine may then retrieve data matching the search results query. The data returned may be based on a match (whether explicit or implicit) between the query (and/or other factors, such as user context and a user profile) and terms in an index accessible to the search engine, such as data index 206 of FIG. 2.

The process then flows to step 506, in which the search stack may retrieve one or more models appropriate to the user's search. In the exemplary implementation of FIG. 2, appropriate model(s) may be selected by the model selector 210 in connection with an index (e.g., model index 212) relating a user's query and/or data returned by the search engine to one or more appropriate model(s).

At step 508, the search stack may then apply the retrieved model(s) to the retrieved data. In the exemplary implementation of FIG. 2, this step may be performed by model application engine 216. In addition to the retrieved data itself, other factors relating to the search such as the user query (or one or more portions thereof) may also serve as input to one or more computations performed as a result of applying the model on the retrieved data. Processing at step 508 may entail multiple iterations. In some embodiments, a model may apply to each item of data, such as a web page included in retrieved data 208. Accordingly, processing at step 508 may be iterative in the sense that it is repeated for each item contained within retrieved data 208. Alternatively or additionally, processing at step 508 may be iterative in that application of a model, whether applied to an individual item of data or a collection of items of data, may entail iteratively applying statements in the model until a stable and consistent result is achieved. Processing at step 508 may alternatively or additionally be iterative in the sense that multiple models may be selected by model selector 210 such that information in compliance with each of the selected models may be generated by processing at step 508.

Turning to step 510, the search stack may then output results generated as a result of the application of the selected model(s) to the retrieved data. In this example the output may entail returning information to a user computer which can then render the information on a display for a user. In some embodiments, the generated information may include some combination of the result of applying the model on the data returned from the search engine and the data itself. For example, the generated information may filter or reorder the search data based on the application of the model, or may provide additional information or information in a different format than the data returned by the search results. In some embodiments, the reordering of the search data may incorporate a time element. For example, a model may identify a time order of a set of multiple events. Application of such a model may then entail identifying search data related to those events, and generating the information returned to the user in an order in accordance to the time order of the model. Though, it should be recognized that the nature of the information generated may be in any suitable form that can be specified as a result of application of a model, which may contain a combination of elements, such as calculations, equations, constraints and/or rules.

After the data is returned to the user (via the user's computing device), the process of FIG. 5 may be done.

Figure 6:
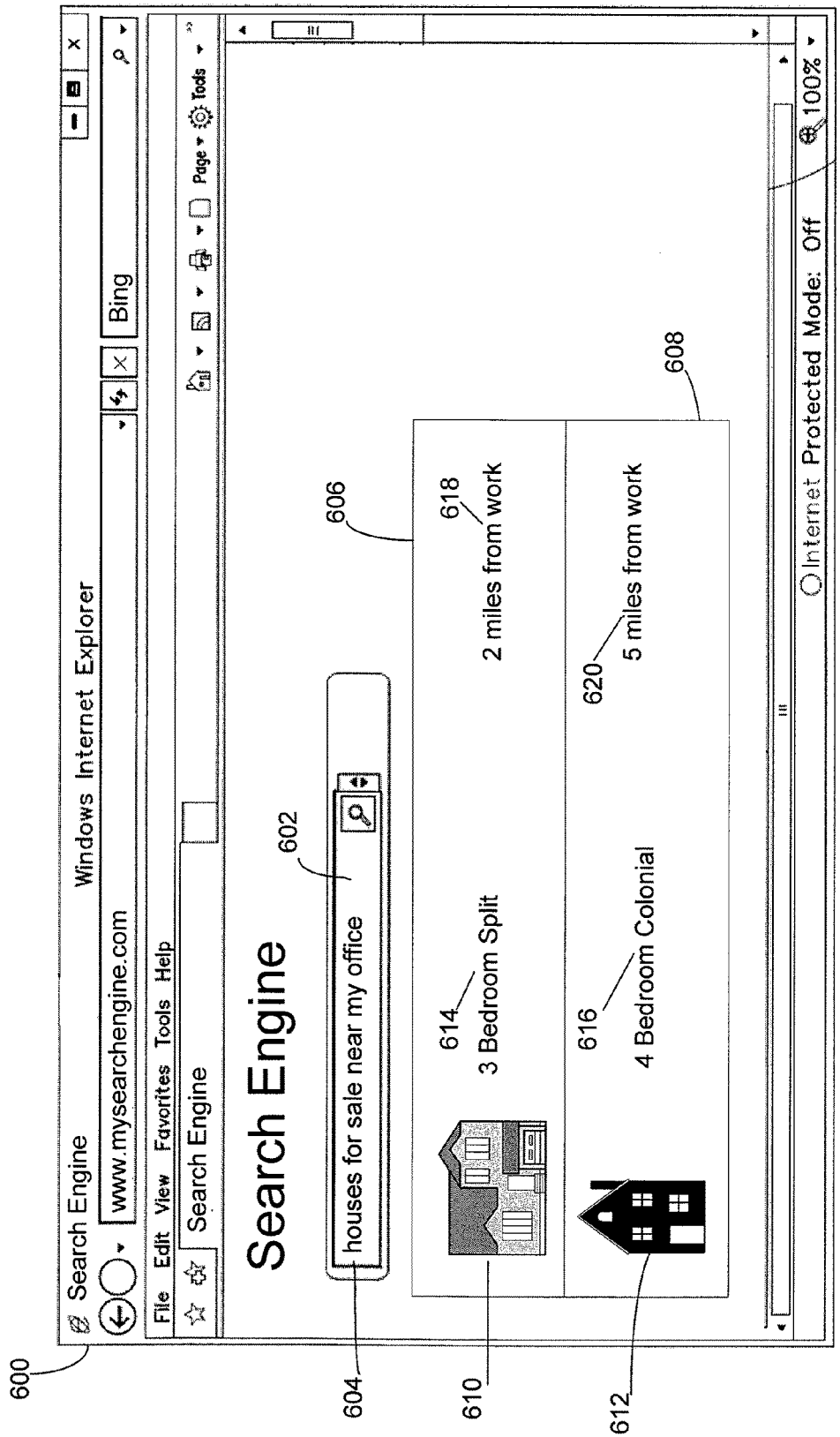
FIG. 6 is an example of a user interface via which a user may enter a search query and display information returned in response to the query.

FIG. 6 is an example of a user interface via which a user may access a search in a retrieved system. In this example, a user may enter a search query and view information returned in response to the query. FIG. 6 illustrates that the interface is displayed by a web browser 600, although any suitable application to generate a user interface may be used. The web browser 600 may be any suitable web browser, illustrated in this example as being INTERNET EXPLORER® developed by Microsoft Corporation, and may execute on a computing device operated by the user (such as computing device 105 of FIG. 1). In the example of FIG. 6, the web browser has loaded a web page returned by a search and retrieval system such as that illustrated in FIG. 2.

The user has entered a text query 604, "houses for sale near my office," in a query input field 602 in the user interface, and sent that query via web browser 600 to a search engine that is part of a search stack according to some embodiments. In response, the search stack returned generated information to the user via the web browser, illustrated in FIG. 6 as returned information elements 606 and 608, which are displayed in the web browser.

After receiving the user's query, the search engine may retrieve a set of data (e.g., web pages) including results of houses for sale near the user's office. The set of data returned from the search engine may be based on matches between the query terms and terms in an index relating to the web pages, as discussed above. Though, as illustrated, other sources of data may be used in evaluating the search query. In this example, the search query includes the phrase "my office." That phrase may be associated with information in a user profile accessible to the search and retrieval system processing the query. Accordingly, on execution of the query, the search and retrieval system may filter results based on geographic location in accordance with the information specified in the user profile. Though, it should be recognized that any suitable technique may be used to process a search query and retrieve data.

Based on the query and/or the retrieved data, an appropriate model may then be selected by the search stack, such as by model selector 210 of FIG. 2. In the example of FIG. 6, the model specified in FIG. 4 relating houses for sale to a user's commute is selected based on the portion of the query text, "near my office."

The selected model is then retrieved and applied to the data (i.e., the web pages of houses for sale) resulting from the search. The application of the model to the data may be performed, for example, by model application engine 216. In the example of FIG. 6, the user's office location may also be a value of an input parameter to the selected model. Because the query text "near my office" does not specify the exact office location, in this example, the user's office location may be taken from the user's profile or the user's context, for example. In this example, as discussed in connection with FIG. 4, applying the selected model comprises determining the GPS coordinates of the address, city and state of each house for sale from the search results, computing the commuting distance between each house and the user's office, and arranging the generated information to display the commuting distance alongside the description of each house for sale. In the example of FIG. 6, the display of the generated information has also been sorted based on commuting distance.

Thus, in the example of FIG. 6, two listings of houses for sale are returned by the search stack and displayed in the web browser, returned information elements 606 and 608. Each of returned information 606 and 608 includes a picture 610 and 612, respectively, of the house for sale and a description 614, and 616, respectively, of the house for sale. In addition, returned information elements 606 includes commuting information 618, "2 miles from work," displayed alongside description 614, and returned information 608 includes commuting information 620, "5 miles from work," displayed alongside description 616. In the example of FIG. 6, returned information elements 606 and 608 are returned as being sorted in ascending order based on commuting distance.

Accordingly, as the result of the application of the model specified by the example of FIG. 4, more useful information is returned to the user. That is, instead of merely returning a list of houses for sale, based on additional dynamic computations performed that are specific to the user or his query (i.e., based on his office location), performed based or dynamically identified data (houses for sale in this example), additional information (i.e., commute information) may be provided to the user than would otherwise be possible, and the results may be arranged accordingly. Accordingly, applying the selected model has allowed the user to receive additional information and presented in a manner that is more pertinent to his search query.

A model may be associated with a persona. For example, a persona may be an individual person (i.e., an actual particular human being). A model of a persona may contain declarative statements including rules, inequalities, equations, constraints, calculations, etc., as discussed above. The application to search results of these declarative statements in the model of the persona, however, unlike a more "generic" model discussed above as in the example of FIG. 4, may generate information that is consistent with characteristics of the persona, and may therefore reflect the persona's likes and/or dislikes, preferences, etc.

Figure 7A:
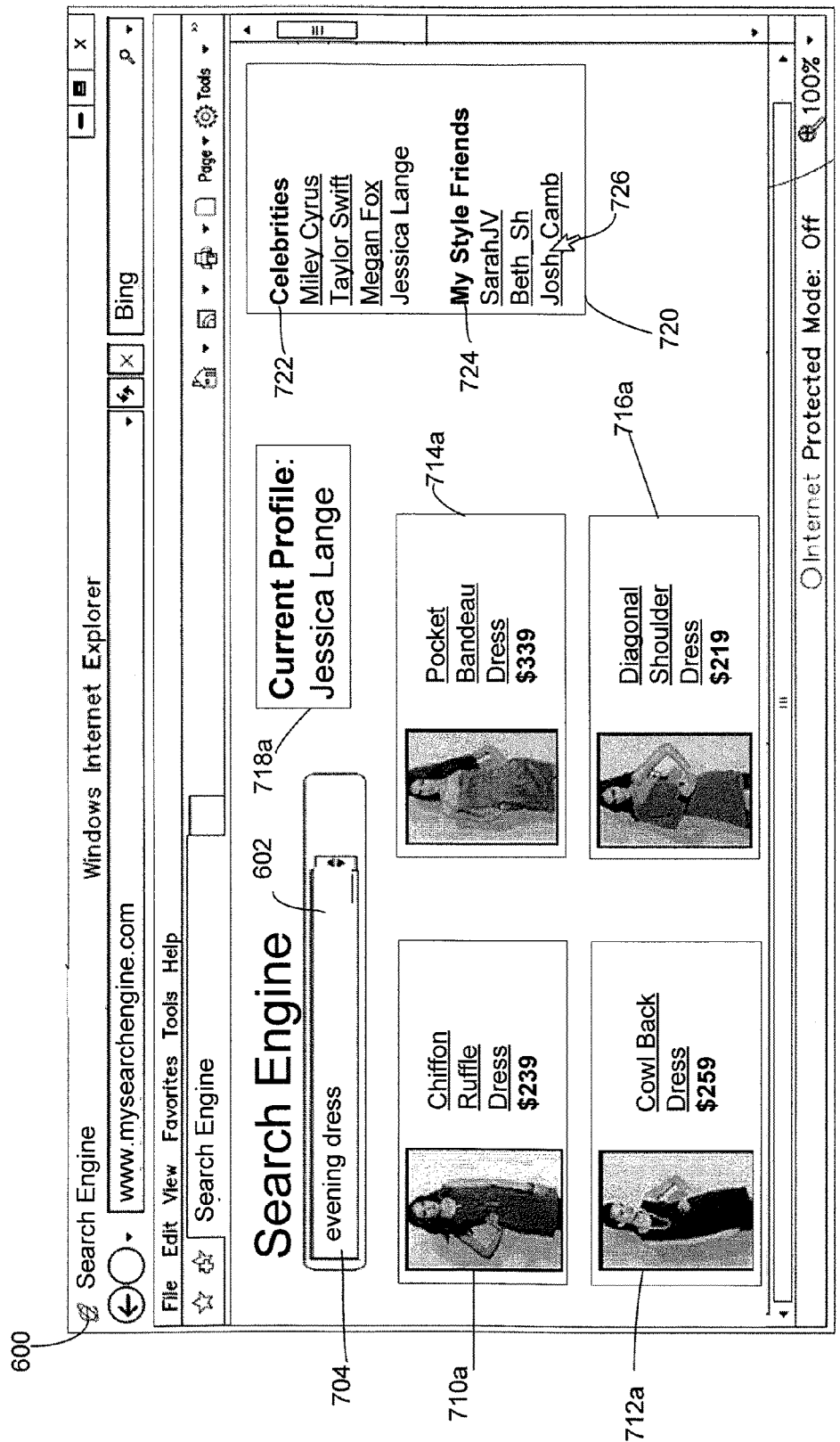
FIG. 7A is an example of a user interface for accessing a search in which a first model of a persona has been applied to the information returned to the user in response to a request for information.
Figure 7B:
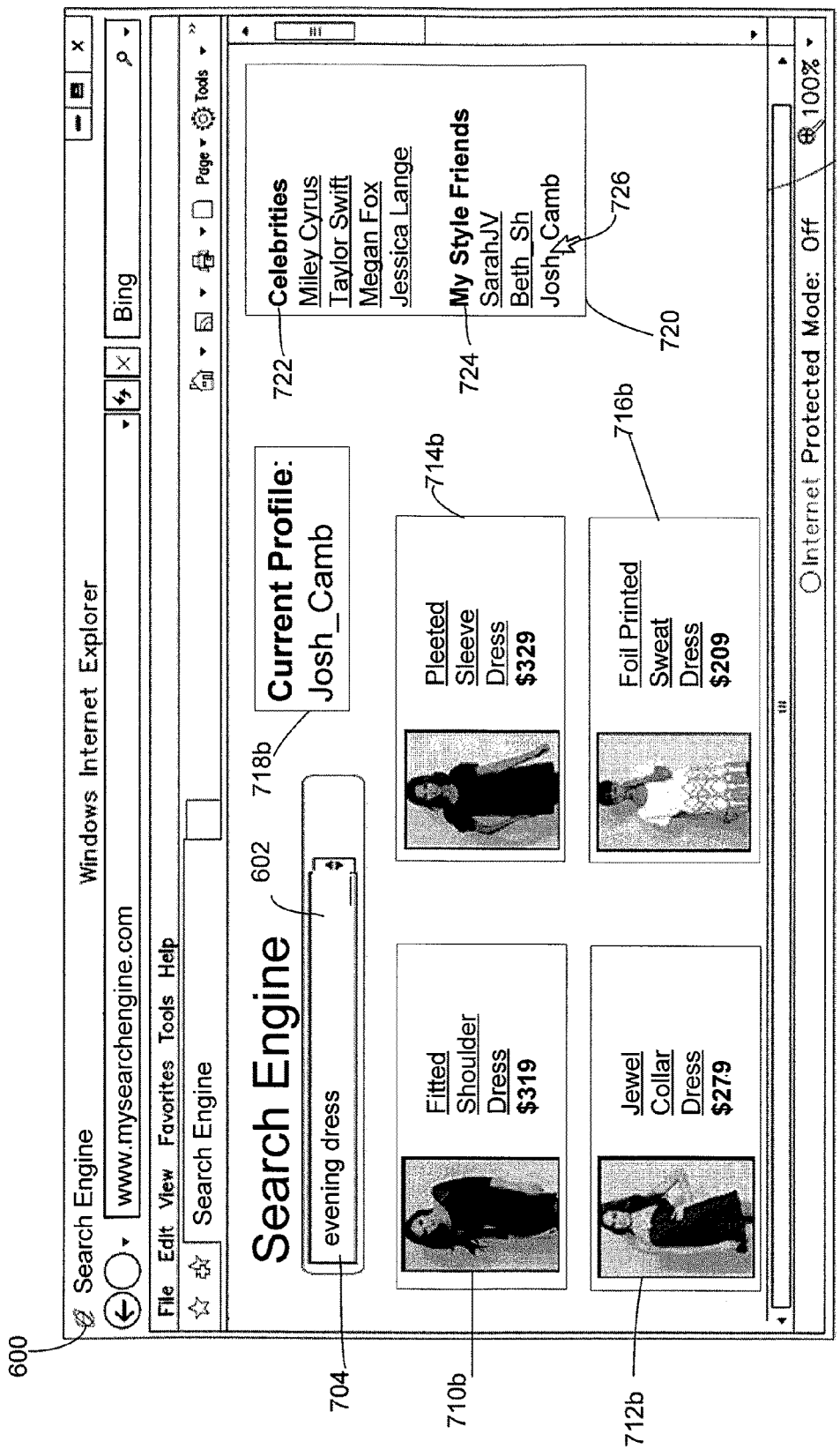
FIG. 7B is another example of the user interface of FIG. 7A in which a user has selected a second model of a persona to be applied to search results.

FIGS. 7A and 7B are examples of the user interface that may be presented by an information retrieval system. In this example, the user interfaces may be used for initiating a search in which a model of a persona has been applied to the information returned to the user in response to a request for information. In response to a request for information (e.g., text query 704, "evening dress," entered in query input field 602) to a search engine that is part of a search stack made via the illustrated web browser 600, the search stack returned generated information to the user, illustrated in FIG. 7A as returned information elements 710*a*, 712*a*, 714*a* and 716*a*. As can be seen in this example, each of these returned information elements 710*a*, 712*a*, 714*a* and 716*a* includes a picture, description, and price of a particular dress.

As part of generating the information returned to the user in FIG. 7A, the search stack has applied a model of a persona. In this example, the model of a persona currently applied to the search results is indicated to the user via an identifier of the currently applied model (i.e., current model identifier 718*a*). As can be seen from this example, current model identifier 718*a* is a name of a particular person (i.e., "Jessica Lange"), which in this example is a celebrity. Thus, in this example, Jessica Lange is the persona of the currently applied model, and returned information elements 710*a*, 712*a*, 714*a* and 716*a* are consistent with characteristics of Jessica Lange. That is, the list of dresses returned to the user may reflect Jessica Lange's style and/or fashion preferences, including, in the example of FIG. 7A, color, fit, designer, cut, etc.

While the applied model may have been automatically selected by the search stack based on a search query, for example, such as by model selector 210, as discussed above, the selection of a model to be applied may also be made by a user. Alternatively, or additionally, the selection may be based by a combination of user input and automatic selection. A user, for example, may provide input specifying a persona and, based on context such as terms in a search query, model selector 210 may select an appropriate model.

Thus, in some embodiments, a list of identifiers of different models of different personae that may be applied to particular search results may be presented to the user, which in the example of FIG. 7A, is displayed in web browser 600. The list of identifiers may have been provided in any suitable way. For example, the list of identifiers may have been provided by model selector 210 as being appropriate to the search results, and/or may be stored locally on a client of the search system and may have been provided by the client.

Thus, FIG. 7A illustrates a list of model identifiers 720 of models of different personae. In the example of FIG. 7A, list of model identifiers 720 includes identifiers for two categories of models of personae, celebrity model identifiers 722 and friend model identifiers 724, although in general, any suitable identifier for a model of a persona may be displayed. Celebrity model identifiers 722 identify models of personae in which each persona is a different celebrity, and in which each identifier corresponds to the name of the celebrity (e.g., "Miley Cyrus," "Taylor Swift," "Megan Fox," and "Jessica Lange").

Friend model identifiers 724 identify models of personae in which each persona is a friend of the user entering the search query. In this example, these friends of the user may have chosen to share a model that defines their characteristics as they relate to dresses, and may therefore reflect each friend's fashion and/or dress style preferences, for example. In the example of FIG. 7A, each of friend model identifiers 724 corresponds to a screen name, user name, or user handle of a friend of the user (e.g., "SarahJV," "Beth_Sh," and "Josh_Camb"). However, it should be appreciated that model identifiers may be identified in any suitable way, including numerically, graphically (e.g., a photo or drawing), using a descriptive name, and/or via speech or other identifying sound.

In some embodiments, the models may be applied by a server that is part of or coupled to a search engine, such as search engine 204. In such a scenario, the models may be stored on the server. Models of celebrities or other models that may be applicable to multiple users may be maintained by the server such that they are publicly accessible. Models associated with persona of people who are friends of the user, may be stored in connection with a user profile, such that the models are private to that user. Though, it should be appreciated that models, particularly private models, may be maintained and/or applied anywhere within the search stack, including possibly on a user computer.

Regardless of where the models are stored or how they are identified, each of the models of personae in the list of model identifiers 720 may be applied to search results for text query 604, in order to generate information returned to the user consistent with the characteristics associated with the persona. Thus, applying any of the models identified by celebrity model identifiers 722 would result in information being generated and returned to the user that is consistent with characteristics of that celebrity, while applying any of the models identified by friend model identifiers 724 would result in information being generated and returned to the user that is consistent with characteristics of that friend.

A user may select one of the models identified in list of model identifiers 720 in order to have that model applied to the search results. The selection may be made using any suitable user input. In the example of FIG. 7A, the user may select a model to be applied by moving the position of a mouse cursor 726 to the identifier for the desired model, and click on the identifier using a mouse. Thus, in FIG. 7A, the user has positioned the mouse cursor above one of friend model identifiers 724, namely, "Josh_Camb."

FIG. 7B is an example of the user interface of FIG. 7A after the user has selected another model to be applied to search results returned in response to text query 704. As can be seen in FIG. 7B, an identifier for the currently applied model has changed to reflect the new model being applied, and current model identifier 718*b* indicates that the model of the persona "Josh_Camb" has been applied to the search results. The information generated in response to text query 704 is now consistent with characteristics of Josh_Camb, rather than characteristics of Jessica Lange, as in FIG. 7A. Thus, as can be seen in FIG. 7B, the generated information displayed in web browser 600 has changed to now display a different set of dresses, returned information elements 710*b*, 712*b*, 714*b* and 716*b*, as compared to the dresses returned and displayed in the example of FIG. 7A. That is, returned information elements 710*b*, 712*b*, 714*b* and 716*b* are consistent with the characteristics of friend Josh_Camb, and may, for example, reflect his fashion and/or style preferences.

A model may include any suitable information such that when it is applied the returned information is consistent with a persona associated with the model. In the example of FIGS. 7A and 7B in which search results are associated with clothes or other fashion items, a model may contain constraints, rules, equations or other information relating to fashion characteristics, such as color, cut, style or price. Though, it should be appreciated that a model may reflect any suitable characteristics or combinations of characteristics associated with a persona.

Thus, the user may see and compare information generated as a result of the application of various models of different personae, in which each persona may have different characteristics and in which the information generated as a result of applying a model of a persona is consistent with characteristics of the persona. While the comparison is described and illustrated in FIGS. 7A and 7B as being performed by viewing the application of each model one at a time, any suitable type of comparison may be performed, including side-by-side comparison of information generated by multiple different models of personae. Regardless of the type of comparison performed, the user may correspondingly choose a persona and receive information that is most appropriate to the user's current needs and/or interests.

Figure 8:
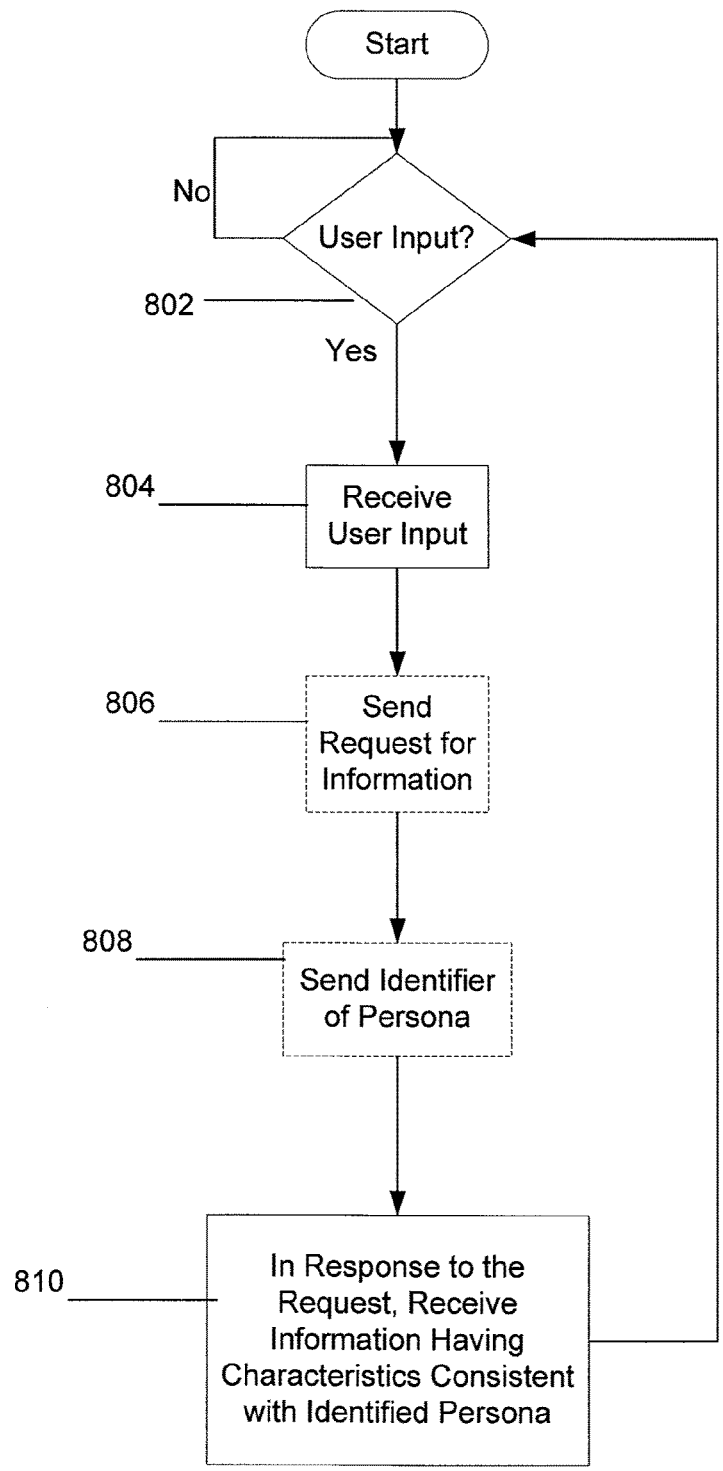
FIG. 8 is a flow chart diagram of a process of performing a search from a client in which a model of a persona is applied to information generated in response to a request for information.

FIG. 8 is a flow chart of a process of performing a search from a client in which a model of a persona is applied to information generated in response to a request for information. The process of FIG. 8 may be performed by a client computer, such as computing device 105 of FIG. 1, that is operated by a user, such as user 102 of FIG. 1. Any suitable user interface may be used on the client computer, including that illustrated in FIGS. 7A and 7B.

The process begins at step 802, which may check for user input. Until there is user input, the process may wait for user input in step 802. On the other hand, if there is user input, the process may proceed to step 804, in which the client computer may receive the user input. The user input may be provided in any suitable way, including via speech, keyboard, stylus input, handwriting recognition, mouse manipulations, etc. The user input may include, for example, a request for information, such as a search query received in any suitable format. In some embodiments, the user input may also include an identifier of a persona. The identifier of a persona may have been displayed to the user in a list of persona identifiers, as discussed in connection with FIGS. 7A and 7B.

At step 806, the client computer may send a request for information (which may be have received as part of the user input from block 804) to an information retrieval system.

The client computer may also optionally, in step 808, send an identifier of a persona to the information retrieval system. In some embodiments, the identifier for the persona may have been received as part of the user input in block 804, and may have been selected by the user. In other embodiments, the identifier of the persona may have been automatically selected as being appropriate to the information request, based, for example, on the search query. The selection of the appropriate persona may be performed by the client computer, in which case the identified persona may be sent to the information retrieval system, or it may be performed by the information retrieval system, thereby obviating the need for the client computer to send the identifier.

A model may be associated with the identified persona, in which the model defines characteristics consistent with the persona. As discussed above, the model may be specified in terms of declarative statements. When the identified persona is sent to the information retrieval system in step 808, declarative statements specifying the model may also be sent to the information retrieval system. The declarative statements may be conveyed in any suitable way, including via information stored in a cookie on the client computer, or using any suitable communications protocol. In other embodiments, the model associated with the identified persona may already be stored in the information retrieval system, in which case declarative statements specifying the model may note be sent to the information retrieval system.

At step 810, a user interface on the client computer may then receive and/or display information in response to the request, in which the information has characteristics consistent with the identified persona. The information may have been generated as a result of applying the model associated with the identified persona to search results returned in response to the user's request for information. In such embodiments, the model may have been applied by any component in the search stack, including any component in the information retrieval system, such as model application engine 216, and/or any suitable component on the client computer. When the model has been applied on the client computer but was previously stored in the information retrieval system and not on the client computer, prior to the application of the associated model by the client computer, a specification of the model may have been transmitted by the information retrieval system to the client computer. As a result of the application of the model, the information generated in response to the user's request is consistent with characteristics of the identified persona.

The process of FIG. 8 may repeat back to step 802, in which it may check again for user input. If user input is received again at step 804, such user input may include either one or both of a new request for information or a new identifier for a persona. Thus, the user may enter only a new request for information, such as a new query, without identifying a persona to be applied to the generated information. In such cases, the identified persona may be automatically selected by any suitable component in the search stack, including the client computer or any suitable component of the information retrieval system.

Alternatively, the user may also only specify a new identifier of a persona, in which case a different model associated with the new persona may be applied to the same user query. In some embodiments, a different model may be applied to the same query by submitting the model and the query as a new request for information, which may trigger a new search. Though, in other embodiments, search results may be cached and different models may be applied to the cached search results. If models are applied to cached results, the results may be cached anywhere within the search stack, including on a client computer, a server hosting a search engine or at any other suitable point.

Regardless of how new results are generated, because the characteristics associated with the new persona may be different, the generated information received at step 810 may also be different to be consistent with the new persona. The user may also enter both a new request for information and new identifier of a persona, in which case a model associated with the new persona may be applied to search results returned as a results of the new request for information. Thus, a user may refine information received as a result of a query by entering a new search query and/or by selecting a different persona whose associated model may be applied to generate the information consistent with characteristics of the new persona.

Figure 9:
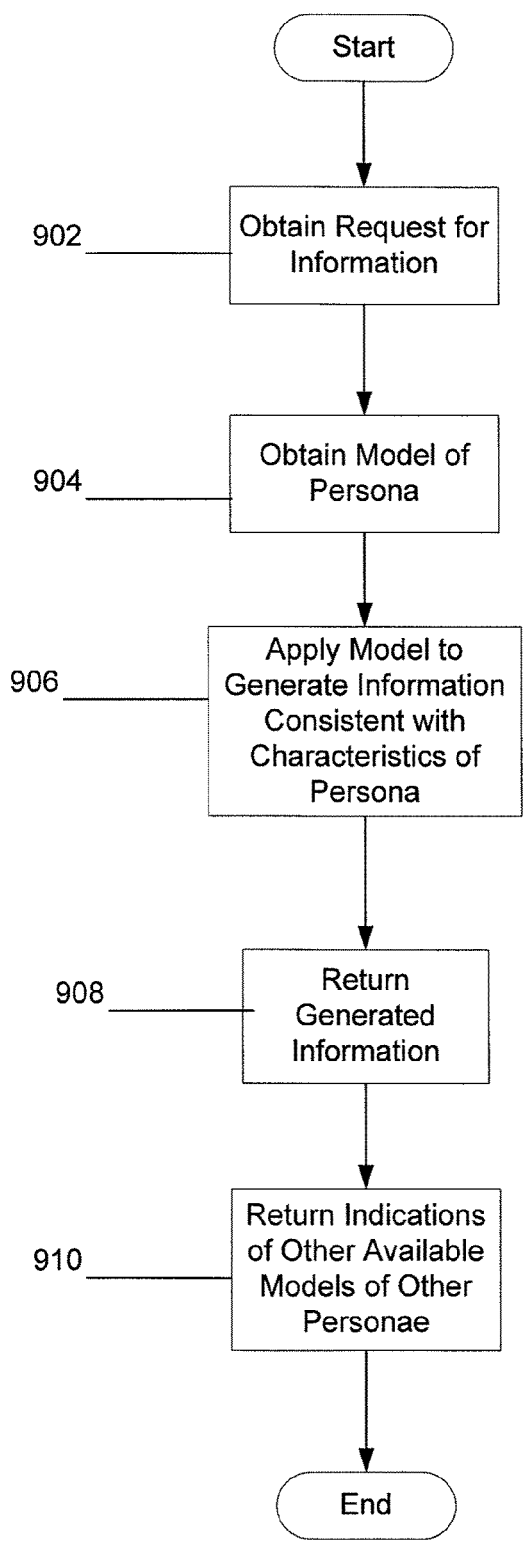
FIG. 9 is a flow chart of a process performed by an information retrieval system for generating information in response to a request, in which the generated information is consistent with characteristics of a persona.

FIG. 9 is a flow chart of a process performed by an information retrieval system of generating information in response to a request, in which the generated information is consistent with characteristics of a persona. The process of FIG. may be performed, for example, by components of search stack 200 illustrated in FIG. 2.

The process of FIG. 9 begins at step 902, in which the information retrieval system may obtain a request for information. This may be performed, for example, by search engine 204 of FIG. 2. The request for information may be received from a client computer, such as computing device 105 of FIG. 1, and may be in any suitable format, as discussed above, including a text query.

At step 904, the process may involve obtaining a model of a persona. This step may involve selecting a model of a persona stored in a component of the information retrieval system, such as pool of models 250, that is appropriate for the request for information. The selection may be performed, for example, by model selector 210 of FIG. 2, based on an identifier of a persona received from a client computer, or, when an identifier is not received from the client computer, based on aspects of the request for information, such as a search query text string. In some embodiments, the model may not be stored in the information retrieval system, but a specification of the model (e.g., a set of declarative statements) may be received from the client computer.

Regardless of the specific way of obtaining the model, at step 906, the model of the persona may then be applied in order to generate information consistent with characteristics of the persona. This step may be performed in any suitable way by any suitable component of the search stack, including model application engine 216 of FIG. 2 or by the client computer. When it is performed by the client computer and when the model is selected by the search retrieval system, this step may involve sending specifications of the model and the search results over which the model will be applied to the client computer. This step may involve applying a set of declarative statements specified in the model over a set of search results returned in response to the user's request for information.

At step 908, the generated information may be returned to the user. In embodiments in which the model is applied by the information retrieval system, this step may involve sending the generated information over any suitable communications link to the client computer.

At step 910, the information retrieval system may also return to the client computer indications of other models of other personae that may be suitable to the request for information. The indications of other models of other personae may then be displayed to the user by the client computer, allowing the user to select a model of a different persona which may be applied to the search results in order to generate the information returned to the user. Thus, although not shown in FIG. 9, the process of FIG. 9 may repeat after step 910 back to step 902 and/or 904, in which case a new request for information and/or a new model of a person may be obtained.

While in conjunction with the example of FIGS. 7A and 7B, a persona is described as being an individual, actual, identifiable, person (e.g., a celebrity or a friend of the user), in some embodiments, a persona may be a more abstract person and not necessarily associated with an individual person. For example, a persona may be a group of people having shared characteristics. Any suitable shared characteristics that may be useful in taking to account for the generating of information to a user may be considered. For example, shared characteristics may include shared and/or common habits, interests, tendencies, background, ability, familiarity with a topic, activity level, or hobbies.

Figure 10:
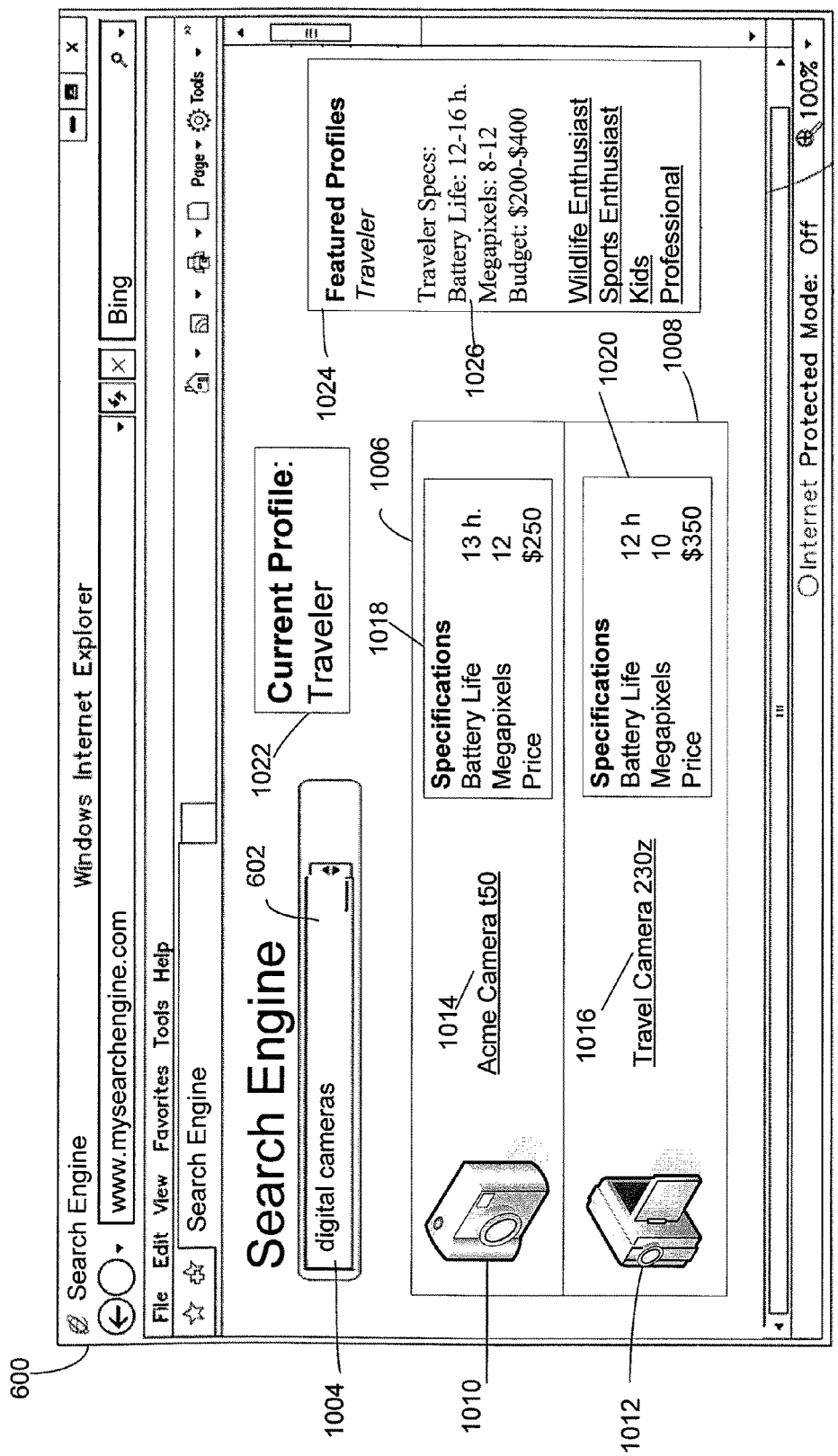
FIG. 10 is an example of a user interface for accessing a search in which a model of an abstract persona has been applied to the information returned to the user in response to a request for information.

FIG. 10 is an example of a user interface for accessing a search, such as the user interface of FIGS. 7A and 7B, in which a model of a persona associated with a group of people has been applied to the information returned to the user in response to a request for information. In response to a request for information (e.g., text query 1004, "digital cameras," entered in query input field 602) to a search engine that is part of a search stack made via the illustrated web browser 600, the search stack returned generated information to the user, illustrated in FIG. 10 as a list of digital cameras, returned information elements 1006 and 1008. As can be seen in this example, each of these returned information elements 1006 and 1008 includes a camera picture 1010 and 1012, respectively, a camera description 1014 and 1016, respectively, and camera specifications 1018 and 1020, respectively.

As part of generating the information returned to the user in FIG. 10, the search stack has applied a model of a persona associated with a group of people having shared characteristics. In this example, the model of a persona currently applied to the search results is indicated to the user via an identifier of the currently applied model (i.e., current model identifier 1022). As can be seen from this example, current model identifier 1022 is an identifier of a type of person in a group of people (i.e., "traveler"), which in this example may be a person interested in a camera who also is a frequent traveler. Thus, in this example, traveler is the persona of the currently applied model, and returned information elements 1006 and 1008 are consistent with characteristics of a traveler. That is, the list of cameras returned to the user may be consistent with specifications suitable for a person who frequently travels, taking into account for example, a camera's battery life, a camera's cost, etc. The example of FIG. 10 displays traveler specifications 1026, which lists ranges of specifications of cameras according to various metrics (e.g., battery life, megapixels, and budget) that are suitable for a frequent traveler. As can be seen in FIG. 10, camera specifications 1018 and 1020 are consistent with traveler specifications 1026.

FIG. 10 also displays a list of group persona identifiers 1024, as being available to be applied to search results. These group persona identifiers 1024 include the current model identifier 1022 (i.e., "traveler"), but also include other persona identifiers, such as "Wildlife Enthusiast," "Sports Enthusiast," "Kids," and "Professional." Each of these personae is associated with different characteristics. As in the example of FIGS. 7A and 7B, a user may select another identifier from the group persona identifiers 1024 to be applied to the search results, and may accordingly receive different information in return that is consistent with the new group persona. The user may thus compare the result of applying different models of different group personae, in order to receive information that more accurately suits the user's current interests or needs.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a search system, the method comprising, by at least one processor, in response to a search query:
    obtaining a request for information from a user;
    obtaining a model of a persona, the model defining characteristics of information consistent with the persona, wherein the model comprises a plurality of elements comprising at least one calculation, equation, constraint and/or rule;
    generating information based at least in part on applying the obtained model; and
    returning to the user the generated information and an identifier of the persona of the obtained model.

2. The method of claim 1, wherein:
    the request for information comprises a search query; and
    obtaining a model of a persona comprises identifying a model based on terms in the search query.

3. The method of claim 1, wherein obtaining a model of a persona comprises:
    obtaining an identifier of the persona from the user; and
    retrieving the model from a pool of models based on the obtained identifier.

4. The method of claim 3, wherein the identifier of the persona identifies an individual human being.

5. The method of claim 4, wherein the identifier of the persona identifies a celebrity.

6. The method of claim 3, wherein the identifier of the persona identifies a group of people with shared characteristics.

7. The method of claim 6, wherein the shared characteristics comprise at least one set of characteristics selected from the group consisting of shared habits, shared interests, shared tendencies, shared background, common ability, common familiarity with a topic, common activity level, and shared hobbies.

8. The method of claim 1, wherein obtaining a model of a persona comprises obtaining from the user a file comprising declarative statements that specify the model.

9. The method of claim 1, wherein the method further comprises:
    identifying a plurality of models of different personae as being relevant to the request for information; and
    returning to the user an identifier for each model of the plurality of models.

10. A method of operating a search system, the method comprising:
    performing with at least one processor:
        receiving a request for information;
        displaying a plurality of identifiers of personae, each identifier of a persona identifying a model of the respective persona selected based on the request;
        obtaining a selected model of a persona by receiving user input indicating a selection of an identifier of a model of a persona from the displayed plurality of identifiers;
        receiving information generated in response to the request; and
        applying the selected model to the received information to generate generated information, the generated information having characteristics consistent with characteristics of the persona of the selected model.

11. The method of claim 10, wherein each model is specified by declarative statements, the declarative statements defining characteristics of information consistent with the persona.

12. The method of claim 10, wherein the persona is an actual human being.

13. The method of claim 10, wherein the persona is a group of people having shared characteristics.

14. At least one non-transitory computer storage medium comprising computer-executable instructions, that when executed by at least one processor,
    cause the processor to execute a method of operating a search system, the method comprising, in response to a search query:
        obtaining a request for information from a user;
        obtaining a model of a persona, the model defining characteristics of information consistent with the persona, wherein the model comprises a plurality of elements comprising at least one calculation, equation, constraint and/or rule;

generating information based at least in part on applying the obtained model; and returning to the user the generated information and an identifier of the persona of the obtained model.

* * * * *